United States Patent [19]

Nishikawa

[11] Patent Number: 4,500,218
[45] Date of Patent: Feb. 19, 1985

[54] KEYBOARD KEY WITH EMBEDDED TOP CHARACTER

[75] Inventor: Yoshikazu Nishikawa, Misato, Japan

[73] Assignee: Toho-Polymer Kabushika Kaisha, Tokyo, Japan

[21] Appl. No.: 380,414

[22] Filed: May 20, 1982

[30] Foreign Application Priority Data

Jun. 5, 1981 [JP] Japan .................. 56-85565

[51] Int. Cl.³ .............................. B41J 5/16
[52] U.S. Cl. ................... 400/490; 400/491; 400/493; 264/245; 428/247
[58] Field of Search .............. 400/120, 128, 241.1, 400/241.2, 241.3, 241.4, 490, 491, 491.1, 491.2, 491.3, 492, 493, 493.1, 493.2, 494, 495, 495.1; 264/245, 246, 247; 428/446, 447

[56] References Cited

U.S. PATENT DOCUMENTS

| | | | |
|---|---|---|---|
| 558,872 | 4/1896 | Devine | 400/491.1 |
| 563,164 | 6/1896 | Graham et al. | 400/491 |
| 793,462 | 6/1905 | Munson | 400/491.1 |
| 1,989,703 | 2/1935 | Leguillon | 264/246 X |
| 2,615,549 | 10/1952 | Marlow | 400/495.1 |
| 2,646,379 | 7/1953 | Poschel | 428/446 X |
| 2,866,711 | 12/1958 | Hart | 428/447 |
| 3,519,456 | 7/1970 | Reed et al. | 400/241.1 X |
| 3,639,155 | 2/1972 | Hartlein et al. | 428/447 |
| 3,699,294 | 10/1972 | Sudduth | 200/166 C |
| 3,702,778 | 11/1972 | Mueller et al. | 428/447 |
| 3,964,594 | 6/1976 | Gabbrielli et al. | 400/491 X |
| 4,034,140 | 7/1977 | Przybyla | 428/447 |
| 4,039,068 | 8/1977 | Giorza et al. | 400/491 |
| 4,042,090 | 8/1977 | Hasebe et al. | 400/490 |
| 4,097,635 | 6/1978 | Sanz Hernandez et al. | 428/447 X |
| 4,339,489 | 7/1982 | Barker et al. | 428/447 X |

FOREIGN PATENT DOCUMENTS

| | | | |
|---|---|---|---|
| 2518801 | 11/1976 | Fed. Rep. of Germany | 400/493 |
| 369303 | 3/1932 | United Kingdom | 400/490 |
| 1521435 | 8/1978 | United Kingdom | 400/490 |

OTHER PUBLICATIONS

IBM Technical Disclosure Bulletin, "One-Use Typewriter Ribbon", Edds et al, vol. 7, No. 6, Nov. 1964, p. 421.

IBM Technical Disclosure Bulletin, "Resistive Ribbon Printing of Typewriter Keys", Wilbur, vol. 20, No. 12, May 1978, p. 5314.

Primary Examiner—Ernest T. Wright, Jr.
Attorney, Agent, or Firm—Edward F. Levy

[57] ABSTRACT

A printing ink is vulcanized on the top surface of an operation indicating member consisting of a silicone-type elastomer and is integrated with the elastomer to form a character of a predetermined shape on the top surface. The printing ink consists essentially of a material which exhibits a vulcanizing mechanism similar to that of the silicon-type elastomer. In manufacturing the operation indicating member, the predetermined character is formed by means of the printing ink on a transfer plate disposed within a mold for molding the body of the indicating member. Next, the silicon-type elastomer is introduced into the mold and heated under elevated pressure to vulcanize and integrate the character on the transfer plate and the silicone-type elastomer, whereby the character is integrally embedded in the top surface of the operation indicating member formed in the mold.

3 Claims, 6 Drawing Figures

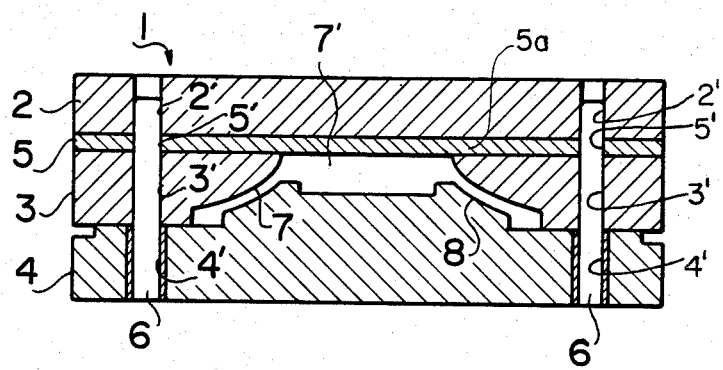
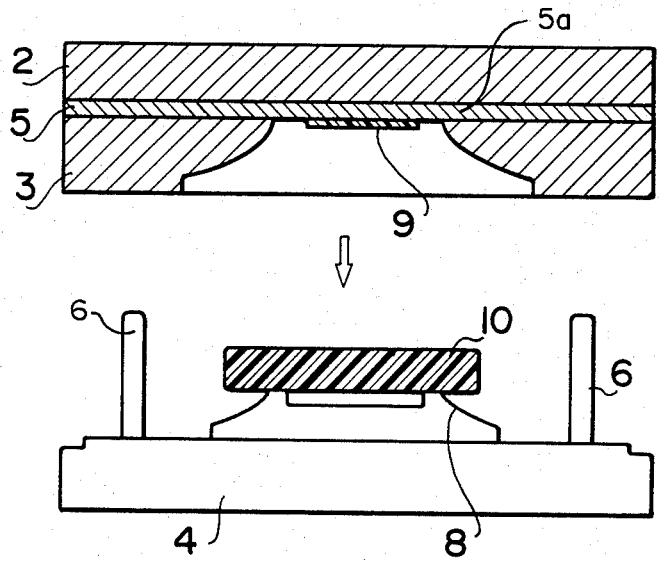

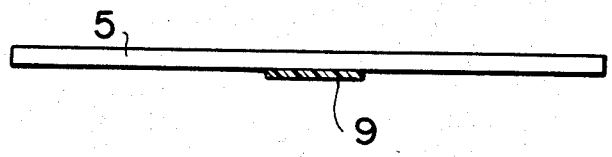
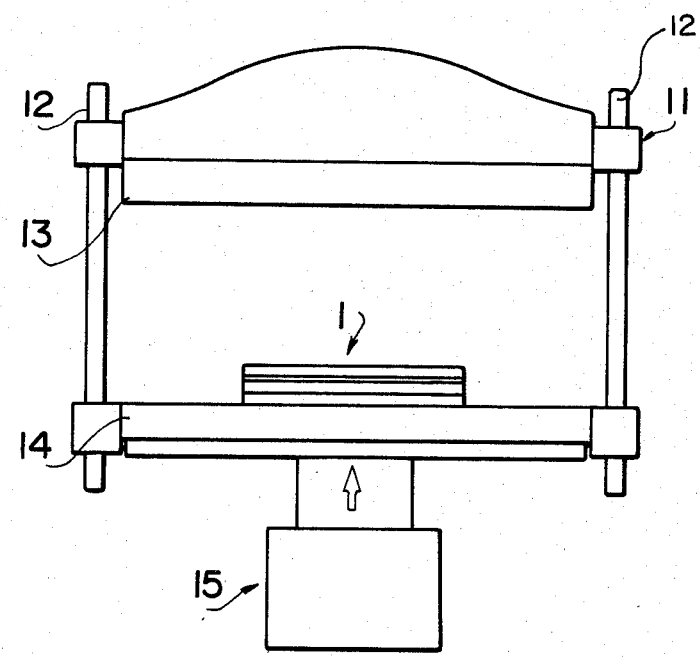

KEYBOARD KEY WITH EMBEDDED TOP CHARACTER

BACKGROUND OF THE INVENTION

1. Field of the Invention

This invention relates to an operation indicating member, and to a method of manufacturing the same. The term "operation indicating member" refers to that part of a key, push-button or the like, of the kind found on a switch-board, keyboard, input unit or table input unit, which indicates by means of a printed character the particular operating position or the information which will be entered by depressing the indicating member.

2. Description of the Prior Art

An example of the abovementioned operation indicating member is a key of the type which is used on the keyboard of a small electronic computer or the like. Such a key essentially comprises a dome-shaped push-button switch made of a rubber elastomer, and a contact member affixed to the undersurface of the push-button switch at the central portion thereof. The top surface of the push-button switch forms the key top which generally has a printed character such as a numeral or arithmetic symbol to indicate the function of the key. The character is printed by applying ink to the key-top surface of the push-button switch.

In the prior art, printing the character in the aforementioned manner is a difficult operation in cases where the key-top surface is not perfectly flat. Moreover, since the character will be raised slightly above the key-top surface owing to the application of the ink, the printed character will tend to be rubbed off with repeated usage, detracting from the appearance of the key and making it difficult to read.

The material most widely adopted to fabricate the rubber push-button switch is silicone rubber. This is because silicone rubber has excellent durability, resistance to heat and cold, a good coloring property, and because such properties as hardness and elasticity remain unchanged despite temperature variations. When the aforementioned rubber push-button switch is formed of silicone rubber, however, a new problem is added to those mentioned above, namely that printing is further complicated by the fact that the ink is difficult to apply to the key-top surface owing to the non-adherance property of silicone rubber. Furthermore, since the silicone rubber is printed following vulcanization, the undried ink tends to blur at its edges immediately after printing, thus making it difficult to print extremely fine lines. This is another problem which awaits solution.

SUMMARY OF THE INVENTION

Accordingly, an object of the present invention is to provide an operation indicating member which bears a character that will not rub off or deteriorate in appearance.

Another object of the present invention is to provide a method of manufacturing an operation indicating member, wherein the surface of the indicating member is provided with a character in good order regardless of the shape of said surface.

Still another object of the present invention is to provide a method of manufacturing an operation indicating member wherein an indicating member can be provided with a character through an efficient and simple procedure in which the character is formed on the indicating member simultaneous with the fabrication thereof.

According to the present invention, the foregoing and other objects are attained by providing an operation indicating member which comprises a body consisting of a silicone type elastomer, and a printing ink consisting of a material which exhibits a vulcanizing mechanism similar to that of the silicone-type elastomer, the printing ink being applied in the form of a character to the top surface of the body and vulcanized together with the silicone type elastomer to form a unitary structure therewith and, furthermore, by providing a method of manufacturing the operation indicating member which comprises the steps of forming a character of a predetermined shape on one side of a transfer plate disposed within a mold for molding the body of the operation indicating member consisting of a silicone-type elastomer, the character being formed by a printing ink which exhibits a vulcanizing mechanism similar to that of the silicone-type elastomer, introducing the silicone-type elastomer into the mold at a position confronting the character formed on the transfer plate by the printing ink, and closing the mold with the application of temperature and pressure to mold the silicone-type elastomer and to vulcanize and integrate the silicone-type elastomer within the mold and the printing ink character on the transfer plate, whereby the printing ink character is transferred to the top side of the molded body of the silicone-type elastomer and integrated with the elastomer.

Other features and advantages of the invention will be apparent from the following description taken in conjunction with the accompanying drawing in which like reference characters designate the same or similar parts throughout the figures thereof.

BRIEF DESCRIPTION OF THE DRAWING

FIG. 1 is a sectional view showing an example of a mold for molding the elastomer body of a push-button switch embodying the present invention;

FIG. 2 is a side view of a transfer plate, and a character formed thereon, disposed in the mold of FIG. 1;

FIG. 3 is a sectional view showing the arrangement of the mold, and the elastomer to be molded, prior to closing the mold;

FIG. 4 is a side view showing an example of a pressing machine used to press and heat the mold shown in FIG. 1;

DESCRIPTION OF THE PREFERRED EMBODIMENT

Figure 5:
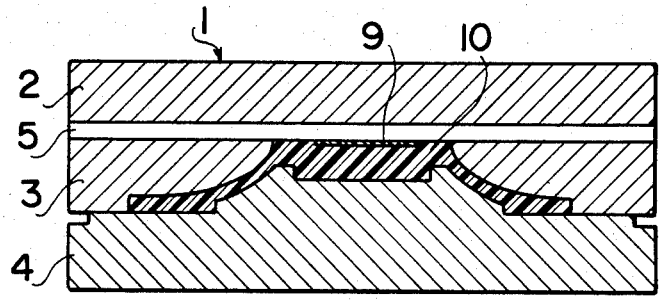
FIG. 5 is a sectional view showing the elastomer pressed within the mold.

The present invention is applicable to an operation indicating member of the type which is operated manually by the user. The particular application described hereinunder concerns a push-button switch, but the invention is in no way limited to such application.

Referring first to FIG. 1, a mold for forming the body of the push-button switch is indicated generally at numeral 1. The mold 1 includes an upper mold 2, an intermediate mold 3, a lower mold 4 and a transfer plate 5 interposed between the upper and intermediate molds 2, 3. Guide holes 2', 3', 4', and 5' are bored through the molds 2, 3, 4 and transfer plate 5, respectively, on the left- and right-hand sides thereof, as shown in the Figure, in such a manner as to align with one another when the molds 2, 3 and 4 and transfer plate 5 are superimposed to perform a molding operation. A pair of guide pins 6 are provided and are received by the aligned guide holes 2', 3', 4', 5' of the superimposed upper mold 2, intermediate mold 3, lower mold 4 and transfer plate 5. It will be appreciated from FIG. 1 that a hole 7 is formed in the intermediate mold 3, and that a projecting piece 8 is provided on the upper surface of the lower mold 4 so as to confront the hole 7, thereby delimiting a molding cavity 7' when the mold 1 is closed. Further, a portion 5a of the transfer plate 5 interposed between the upper mold 2 and intermediate mold 3 is constantly exposed to the molding cavity 7', opposite the projecting piece 8.

The mold 1 having the foregoing construction is employed to manufacture a rubber push-button switch, embodying the present invention, through a method which will now be described with reference to FIGS. 2 through 5.

First, with reference to FIG. 2, a character of a predetermined shape, indicated at numeral 9, is formed on the portion 5a of the transfer plate 5 which will be exposed to the molding cavity 7'. The character 9 consists of a printing ink, and is formed on the transfer plate 5 by means of a screen printing technique. The printing ink in this case consists of a mixture of a polysiloxane polymer, which is a material exhibiting a vulcanizing mechanism similar to that of the silicone-type elastomer which will be used to mold the body of the push-button switch, and a pigment for endowing the ink, namely the character 9, with the desired color. In FIG. 3, the upper mold 2 and intermediate mold 3 are superimposed to embrace from either side the transfer plate 5 having the character 9 formed thereon, in which state the molds 2, 3 and transfer plate 5 are maintained by the guide pins 6 upon which they are mounted. Next, a silicone-type elastomer 10 of predetermined dimensions, and which serves as the raw material for fabricating the push-button switch, is placed on the projecting piece 8 provided on the lower mold 4, so that the elastomer 10 opposes the character 9 formed on the exposed portion 5a of the transfer plate 5. The upper mold 2, transfer plate 5 and intermediate mold 3 are then superimposed on the lower mold 4 with the guide pins 6 being received in the aligned holes 2', 3', 4', and 5'. Thenceforth the mold 1 assembled in the above manner is closed and submitted to heat and pressure by means of a pressing machine, as will now be described.

An example of the pressing machine is shown in FIG. 4. The pressing machine, indicated generally at numeral 11, includes a plurality of guideposts 12, a heating platen 13 secured at the upper portion of the guideposts 12, a heating platen 14 mounted on the guideposts 12 for vertical movement, and a pressurizer 15 for driving the heating platen 14 vertically along the guideposts 12. The mold 1, assembled in the aforementioned manner, is set on the heating platen 14 of the pressing machine 11, as illustrated in FIG. 4, and the heating platen 14 is elevated by actuating the pressurizer 15, thereby compressing the mold 1 between the heating platens 13, 14 to heat and compress the materials 9 and 10 within the mold 1.

Figure 6:
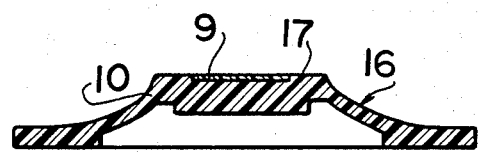
FIG. 6 is a side sectional illustrating the body and the transferred character of the molded push-button switch.

The application of heat and pressure in the above manner molds the silicone-type elastomer 10 into a rubber push-button owing to its compression between the intermediate mold 3 and lower mold 4 and, at the same time, causes the printing ink character 9 formed on the transfer plate 5 to be vulcanized while in pressured contact with the silicone-type elastomer 10, so that the character 9 and elastomer 10 are integrated or formed into a unitary structure. This occurs because the printing ink forming the character 9 consists essentially of polysiloxane which exhibits a vulcanizing mechanism similar to that of the silicone-type elastomer 10. Vulcanizing the character 9 and silicone type elastomer 10 while they are in pressured contact therefore embeds the character 9 into the upper surface of the elastomer 10 and forms a unitary structure. Following the molding operation the mold 1 is opened and the contents removed, providing the molded push-button body 16 having the printing ink character 9 integrally embedded in the upper surface thereof, which upper surface defines the key top 17 of the push-button, as illustrated in FIG. 6.

The pressure applied to the mold 1 by the pressing machine 11 is within the range of from 30 to 200 kg/cm$^2$, ordinarily 100 to 150 kg/cm$^2$. The higher pressure of about 200 kg/cm$^2$ is employed to provide an indicating member having greater dimensional accuracy. The temperature applied to the mold 1 is within the range of from about 115° to 185° C., which is sufficient to achieve satisfactory vulcanization.

In accordance with the present invention as described and illustrated hereinabove, a character 9 is integrally embedded in the surface 17 of an operation indicating member 16 that is to be read, rather than merely being printed on said surface as in the prior art. Accordingly, the surface having the character need not be flat and the character will not rub off. The resulting indicating member has an attractive appearance, therefore, and will retain such appearance even after long periods of frequent use. Furthermore, the indicating member can be provided with the character 9 regardless of the shape of the surface 17 in which the character 9 is embedded. Since the indicating member 16 is molded at the same time that it is provided with the character 9, the operation for forming the character is simplified and made more efficient.

In the foregoing embodiment the material used to form the operation indicating member 16 is a silicone-type elastomer, namely a mixture of silicone rubber and a synthetic rubber. However, use can be made solely of silicone rubber. Additionally, titanium oxide, carbon, iron oxide, ultramarine, red oxide or the like may be employed as the pigment which is mixed with the polysiloxane constituting the printing ink.

The method of manufacturing described hereinabove is an ordinary compression molding method. It should be noted, however, that the same effects can be obtained with an injection molding method.

As many apparently widely different embodiments of the present invention can be made without departing from the spirit and scope thereof, it is to be understood that the invention is not limited to the specific embodiments thereof except as defined in the appended claims.

What is claimed is:

1. An operation indicating member which comprises a body made of a soft silicone-type elastomer, said body having a smooth, uninterrupted top surface, and a pre-printed indicia layer embedded in the top surface of said body and having a top surface extending flush with the top surface of said body as a continuation thereof, said pre-printed indicia layer comprising a printing ink consisting of a material having a vulcanizing mechanism similar to that of the silicone-type elastomer, said printing ink being embedded in the form of an indicia character in the soft silicone-type elastomer forming the top surface of said body and vulcanized together with said silicone-type elastomer to form a unitary structure therewith, said pre-printed indicia layer being initially formed by printing of said ink on a separate transfer plate and transferred to the top surface of said body without punching by virtue of the co-vulcanization of said ink and said body.

2. The operation indicating member according to claim 1, in which the printing ink consists of a mixture of polysiloxane polymer and a pigment.

3. A method of manufacturing an operation indicating member having a body made of a silicone-type elastomer, which comprises the steps of:

printing a character of a predetermined shape on one side of a transfer plate by the application thereto of a layer of printing ink which has a vulcanizing mechanism similar to that of said silicone-type elastomer;

mounting said transfer plate with the printed character bonded thereon within a mold for molding the body of the operation indicating member;

disposing the silicone-type elastomer in the mold at a position confronting the character formed on the transfer plate by the printing ink;

closing the mold with the application of temperature and pressure to mold said body from the silicone-type elastomer and simultaneously to vulcanize and integrate the silicone-type elastomer and the printing ink character, whereby the layer of printing ink is embedded in the top side of the molded body of silicone-type elastomer and integrated with the elastomer, and opening the mold and removing the molded body therefrom, with the embedded printed character peeling from the transfer plate.

* * * * *